(No Model.) 2 Sheets—Sheet 1.
J. GIFFORD.
CHURN.
No. 257,570. Patented May 9, 1882.
Fig. 1.
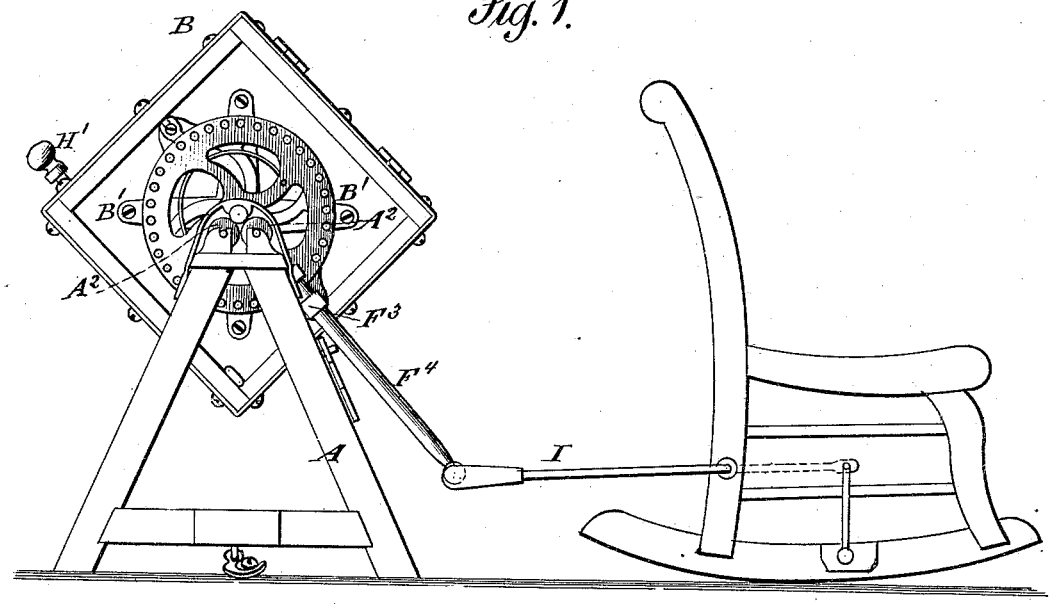
Fig. 2.
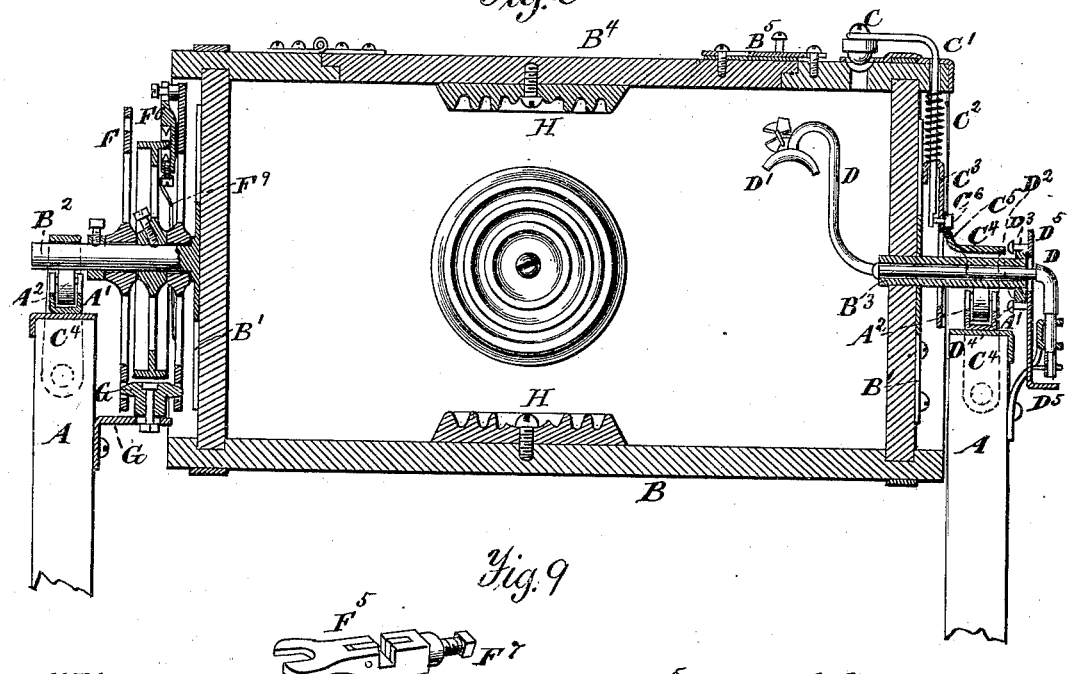
Fig. 9.
Witnesses.
A. Ruppert
D. P. Core
Inventor.
J. Gifford
Holloway & Blanchard
Attys

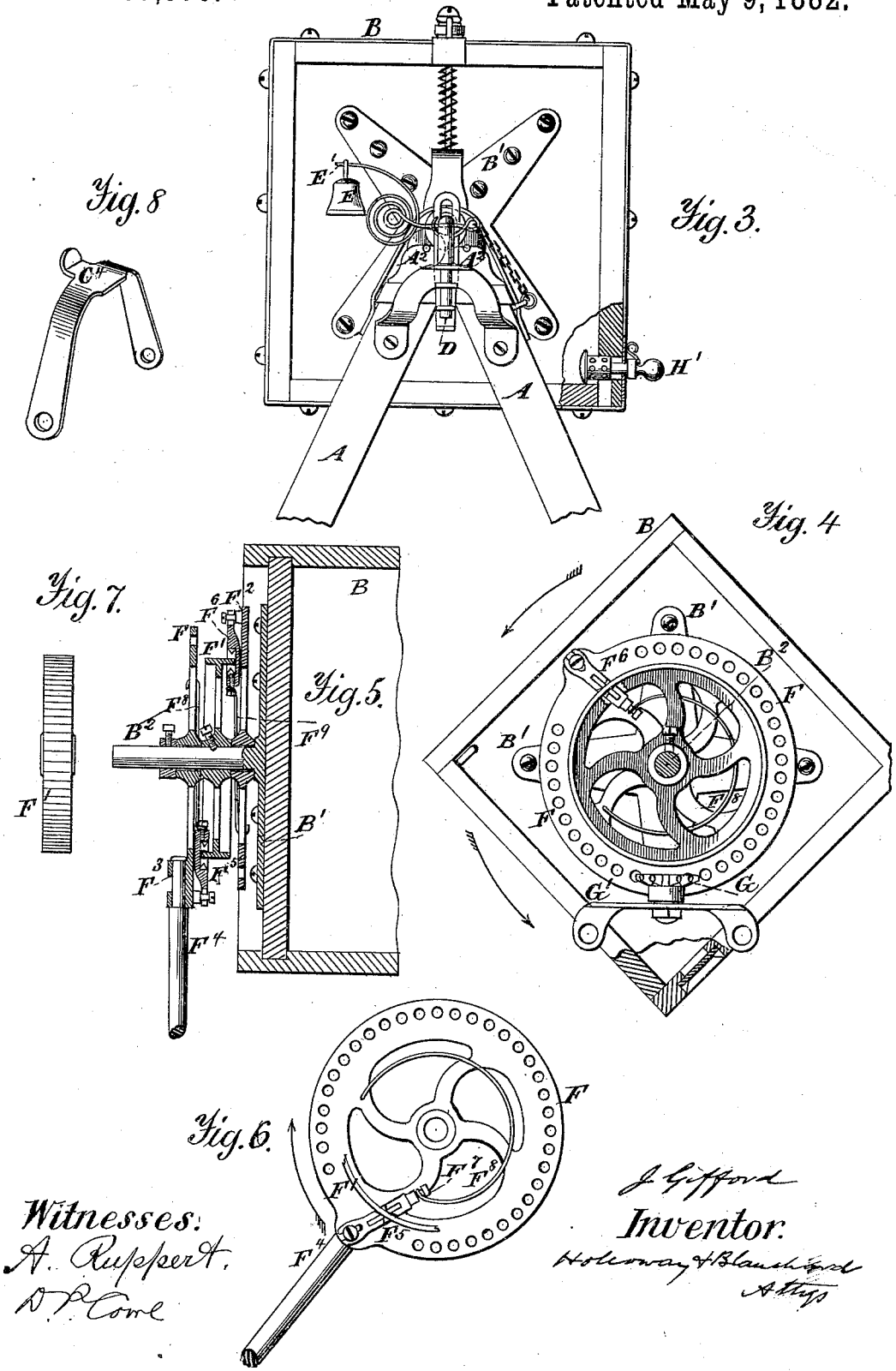

UNITED STATES PATENT OFFICE.

JOHN GIFFORD, OF WATERTOWN, NEW YORK.

CHURN.

SPECIFICATION forming part of Letters Patent No. 257,570, dated May 9, 1882.

Application filed December 22, 1881. (No model.)

*To all whom it may concern:*

Be it known that I, JOHN GIFFORD, a citizen of the United States, residing at Watertown, in the county of Jefferson and State of New York, have invented certain new and useful Improvements in Churns; and I do hereby declare the following to be a full, clear, and exact description of the invention, such as will enable others skilled in the art to which it appertains to make and use the same, reference being had to the accompanying drawings, and to the letters or figures of reference marked thereon, which form a part of this specification.

My invention relates to churns to be used for converting cream into butter; and the objects of my improvements are, first, to provide a rectangular intermittently-revolving vessel in which the cream is alternately dashed from point to point by the movements of the vessel; second, to provide novel mechanism for giving to the vessel its intermittent movements; third, to provide suitable valves for the escape of any gas or vapor that may be generated in the vessel containing the cream while the churning is being done; fourth, to provide suitable mechanism for giving an alarm, and thus notifying the operator when the granulation of the material in the vessel has taken place; and, fifth, to provide certain combinations and arrangements of devices for making the parts operative. I attain these objects by the mechanism illustrated in the accompanying drawings, in which—

Figure 1 is an end elevation of my improved churn, showing one method of operating it, and showing also the means of connecting the operating mechanism with the intermittently-moving vessel and the supporting-frame. Fig. 2 is a longitudinal elevation, partly in section, showing the intermittently-moving vessel, the sack or globule breakers upon its inner surface, portions of the frame upon which the vessel rests, anti-friction rollers, which carry the journals of said vessel, the valves for the escape of the gas or vapor, the wheels which give the intermittent movement to the vessel, and a portion of the mechanism for notifying the operator when granulation has taken place. Fig. 3 is an end view, showing the vessel which contains the cream, a portion of the frame, and the mechanism for giving the alarm. Fig. 4 is a view of the opposite end, showing two of the wheels which give the intermittent movement to the vessel, one of the dogs or ratchets for causing such movement, a spring for holding said dog or ratchet in position, and a sprocket or gear wheel for transferring the motion of one of the moving wheels to the other. Fig. 5 is an elevation of a portion of the cream-containing vessel, showing the driving-wheels, the method of constructing the dogs or ratchets which move them, and a portion of the connecting-rod. Fig. 6 is a plan view of one of the driving-wheels, showing also a part of the connecting-rod and of an intermediate wheel, one of the dogs or ratchets that act upon said wheel, and a spring for holding it in position. Fig. 7 is an edge view of the intermediate driving-wheel, showing a roughened surface. Fig. 8 is a detached view of a bracket which secures the journals of the revolving vessel in its position on the anti-friction rollers, and Fig. 9 is a plan view of one of the dogs or ratchets with its pivoted pawls, it showing also a sectional elevation of the same.

Similar letters refer to similar parts throughout the several views.

In constructing churns embodying my improvements I provide a frame, A, of the form shown, or of any other form that will adapt it for the reception of brackets A', which have in their upper surfaces bearings for the reception of anti-friction rollers $A^2$ $A^2$, upon which the journals of the intermittingly-moving vessel B rest, the office of said rollers being to lessen as far as possible the friction upon said journals, and thus render it possible to operate the churn with the least possible expenditure of power.

The vessel B, above alluded to, is by preference made of the rectangular form shown, in order that as it is moved intermittently the cream contained therein shall be dashed from point to point, and thus the sacks or globules which contain the butter be broken. To the ends of this vessel there are attached plates of metal B' B', they being held in position by suitable bolts or screws entering the heads of the vessel. Formed upon or attached to the outer surface of these plates are journals $B^2$ $B^3$, the latter being hollow for a purpose soon to be described. These journals rest and turn upon the anti-friction rollers $A^2 A^2$, two of each being placed at either end of the vessel B, which is provided at one of its sides with a door, $B^4$, which is made to close the aperture for the introduction of the cream to the vessel in such a manner as to cause it when shut to prevent any leak at that point, it being, for convenience' sake, hinged to the vessel at one of its ends and secured at its opposite end by a sliding dog, $B^5$, as shown in Fig. 2.

For the purpose of providing for the escape of any gas or vapor that may be generated in the vessel B while the operation of churning is being carried on, there is placed near one end of said vessel, and upon that side thereof which is provided with the door $B^4$, an outwardly-opening valve, C, which is carried upon a bent arm, C', the outer vertical portion of which passes through the side of the vessel and a plate of metal, which form a support and guide therefor, said vertical portion having upon its lower or inner part a spiral spring, $C^2$, the upper end of which rests against the projecting part of the vessel. Upon this bent arm C', and below or within the spring, there is attached a slotted plate of metal, $C^3$, through which the hollow journal $B^3$ of the vessel B passes, said journal being covered by a bearing, which is attached to a strap of metal, $C^4$, which extends downward, and is secured to the frame A, as shown in Fig. 2.

Upon the upper surface of the strap $C^4$ there is formed a projection, $C^5$, and the slotted plate $C^3$ is provided with a bolt or set-screw, $C^6$, it being placed in such a position therein that as the vessel B is revolved, and when the valve C is upon its upper surface, it will come in contact with the projection $C^5$ and force the valve open, the spring keeping it tightly closed at all other times.

As a further means of providing for the escape of gas or impure vapor from the vessel B, there is provided a pipe, D, which passes through the hollow journal $B^3$ and is bent upward, as shown in Fig. 2, its inner end being furnished with a branch, D', through which the gas enters. Owing to the position of the inner end of this pipe and to the fact that the openings to it are upon its under surface it follows that no liquid substance can enter it, as it does not rotate with the vessel, but remains stationary in the position shown, it being held by a bracket having upon it guides for that purpose, as shown in Fig. 3.

Upon the outer end of journal $B^3$ there is fixed an eccentric, $D^2$, which works between two pins, $D^3 D^4$, which are fixed in a sliding bar, $D^5$, through a slot in which the pipe D passes, the lower end of said bar being bent outward, as shown in Fig. 2, said outwardly-projecting portion forming or carrying a valve which, when the full portion of the eccentric $D^2$ is up, comes in contact with the lower end of pipe D and closes it; but when said full side is down allows the bar to fall, and thus permits the escape intermittently of any gas that may be in the vessel. These valves also perform another useful function, which is to admit air to the vessel B, and thus ventilate the cream at all times when the atmospheric pressure outside is greater than the pressure of gas or vapor within.

As a means of giving notice to the operator when granulation of the cream has taken place to such an extent as to make it desirable to stop the agitation thereof, there is placed upon the inner end of pipe D a device such as is shown in Fig. 2, or of any other kind that will form a lodging-place for the granulated cream or butter to lodge upon as soon as it is formed, in doing which it will cause the pipe to be turned or vibrated in its supports to such an extent as to cause the ringing of a bell, E, which is suspended upon a coiled wire, E', one end of which is passed through the pipe D outside of the journal through which it passes, the opening in which is of sufficient size to allow the pipe to move therein to such an extent as to cause the load of butter upon its inner end to turn it sufficiently to cause the required ringing of the bell.

In providing for imparting to the vessel B an intermittent rotative movement there are placed upon the journal $B^2$ thereof three wheels, F, F', and $F^2$, those lettered F and $F^2$ being on either side of the one lettered F', it being fast to said journal and provided with a rim like an ordinary pulley, or it may be a disk of metal of the requisite thickness, its periphery being roughened to facilitate the action of dogs or pawls, soon to be described. The wheels F and $F^2$ are so placed on the journal as to move freely thereon, the outer one, F, being provided with a series of holes, as shown in Fig. 6, or it may be with inwardly-projecting dogs and with a suitable clamp or socket, $F^3$, for attaching thereto a connecting-rod, $F^4$. It is also provided with a dog or ratchet, $F^5$, which is provided with pawls, as shown in Fig. 9, which are so arranged that when the connecting-rod is moved inward they will move freely over the rim of wheel F without imparting any motion thereto; but when said rod is moved outward they will clasp said rim and move the wheel, and consequently the vessel B, through a fraction of a revolution. The wheel $F^2$ is the same as the one lettered F, except that it is provided with an ear, to which to attach a dog or ratchet, $F^6$, which is pivoted thereto, as shown in Fig. 7.

The construction of the dogs or ratchets is illustrated in Fig. 9, where it will be seen that the pawls and the dogs or ratchets are sharpened upon the parts which bear and act upon the wheel F'.

For the purpose of holding the dogs or ratchets $F^5$ and $F^6$ in their proper positions with reference to the wheel with which they engage, springs $F^8$ and $F^9$ are attached to the wheels F and $F^2$, their outer or free ends being secured to the dogs or ratchets by a screw, $F^7$, by which means the proper angularity of the dogs or ratchets is preserved, in order that when moved in the proper direction they shall move the wheel F', and that when moved in the opposite direction they shall slide freely thereon.

In order that the movements of the outer wheel, F, may be imparted to the inner one, F², and thus an intermittent but rotative movement be imparted to the vessel, there is placed between the wheels F and F² a pinion, G, which is held in position by being secured to a bracket, G', attached to the frame, its arrangement being such as to cause it to mesh into both the wheels F and F², so that whichever way the connecting-rod is moved the dogs or ratchets will one of them clutch the rim of the wheel F' and cause a movement of the vessel B, which, by a succession of the movements imparted to the dogs, will be made to perform an entire revolution or a succession of such movements. When the movements described commence they are so rapid as to cause the material in the churn to be dashed from one point to another; and as the movements are suddenly arrested it follows that the cream is again dashed back to a point on the opposite side of the vessel, and thus a sufficient agitation is caused to in a short period of time convert the cream into butter, the sacks or globules containing it being broken to some extent by sack-breakers H, secured to the interior of the vessel. When the churning has proceeded to the proper point the valve H' is opened and the buttermilk is drawn off, said valve being provided with a strainer to prevent the particles of butter from passing out with the milk.

This churn may be driven by any convenient power, it being only necessary that the shaft which moves the vessel B shall be provided with a crank of the requisite length to give the required amount of movement. As a convenient method of giving the required movement, I have shown how it may be done by a rocking-chair, the connecting-rod F⁴ being pivoted to a rod, I, which may be bent so as to pass through the posts of the chair, or it may be by an arm fast to a rod running through the rockers, both methods being shown in Fig. 1.

After the buttermilk has been drawn off, if it is desirable to use the churn as a butter-washer, it may be done by closing the valve H' and imparting the required movement to the vessel B, as above described, when the washing with water or with brine will be accomplished.

Having thus described my invention, what I claim, and desire to secure by Letters Patent, is—

1. The intermittingly-revolving vessel B, mounted upon anti-friction rollers, and having an intermittent movement imparted to it by the wheels F, F', and F², whereby the cream is dashed from side to side of the vessel when the movement takes place, substantially in the manner and for the purpose set forth.

2. The combination of the rectangular intermittingly-rotating vessel B and the wheels F F' F², dogs or ratchets F⁵ and F⁶, springs F⁸ and F³, pinion G, and connecting-rod F⁴, for giving to the vessel B an intermittent rotative movement, substantially as and for the purpose set forth.

3. The combination of the automatically-operative and intermittingly-opening valve C, bent arm C', spring C², slotted plate C³, strip C⁴, projection C⁵, and the set-screw C⁶, the arrangement of the parts being substantially such as described, whereby they are made to ventilate the vessel B during the operation of churning, as set forth.

4. The combination of the vessel B, the hollow journal B³, the pipe D, the eccentric D², and sliding valve D⁵, the parts being arranged for joint operation substantially as and for the purpose set forth.

5. The combination of the vessel B, the pipe D, the wire E', and bell E, the parts being arranged substantially as and for the purpose set forth.

In testimony whereof I affix my signature in presence of two witnesses.

JOHN GIFFORD.

Witnesses:
EDGAR NORTH,
GEO. ADAMS.